(12) United States Patent
Ghadimi et al.

(10) Patent No.: US 12,301,429 B2
(45) Date of Patent: May 13, 2025

(54) METHOD AND DEVICES FOR TRANSFER LEARNING FOR INDUCTIVE TASKS IN RADIO ACCESS NETWORK

(71) Applicant: Telefonaktiebolaget LM Ericsson (publ), Stockholm (SE)

(72) Inventors: Euhanna Ghadimi, Bromma (SE); Jonas Wiorek, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 496 days.

(21) Appl. No.: 17/433,154

(22) PCT Filed: Feb. 26, 2019

(86) PCT No.: PCT/IB2019/051544
§ 371 (c)(1),
(2) Date: Aug. 23, 2021

(87) PCT Pub. No.: WO2020/174259
PCT Pub. Date: Sep. 3, 2020

(65) Prior Publication Data
US 2022/0191107 A1 Jun. 16, 2022

(51) Int. Cl.
*H04L 41/16* (2022.01)
*G06N 5/04* (2023.01)
(Continued)

(52) U.S. Cl.
CPC ............. *H04L 41/16* (2013.01); *G06N 5/04* (2013.01); *H04L 41/147* (2013.01); *H04W 24/02* (2013.01); *H04W 24/10* (2013.01)

(58) Field of Classification Search
CPC ......... H04L 41/16; H04L 41/147; G06N 5/04; H04W 24/02; H04W 24/10
See application file for complete search history.

(56) References Cited

U.S. PATENT DOCUMENTS 11,537,506 B1\* 12/2022 Dasgupta ............ G06F 11/1476
2015/0332165 A1\* 11/2015 Mermoud .............. G06N 5/048
706/12
(Continued)

FOREIGN PATENT DOCUMENTS

EP 3439241 A1 2/2019
WO 2018164618 A1 9/2018

OTHER PUBLICATIONS

Lazaric "Transfer in Reinforcement Learning: a Framework and a Survey" Marco Wiering, Martijn van Otterlo. Reinforcement Learning—State of the art, 12, Springer, pp. 143-173, 2012.
(Continued)

*Primary Examiner* — Fadi Haj Said
(74) *Attorney, Agent, or Firm* — Rothwell, Figg, Ernst & Manbeck, P.C.

(57) ABSTRACT

A framework for inductive tasks in RANs includes a source learner, a target learner and an inference entity that can be merged into existing or future RAN functions. The signaling mechanism between different framework entities may also be merged into existing or future network interfaces. The framework can be reused by multiple inductive tasks to perform a variety of tasks such as prediction of some network phenomena or to improve certain KPIs in the network.

8 Claims, 10 Drawing Sheets

(51) Int. Cl.
    *H04L 41/147*    (2022.01)
    *H04W 24/02*    (2009.01)
    *H04W 24/10*    (2009.01)

(56) References Cited

U.S. PATENT DOCUMENTS

| | | | |
|---|---|---|---|
| 2018/0293488 A1* | 10/2018 | Dang | G06N 3/045 |
| 2020/0034665 A1* | 1/2020 | Ghanta | G06N 5/04 |
| 2020/0272859 A1* | 8/2020 | Iashyn | G06F 18/217 |
| 2021/0219384 A1* | 7/2021 | Liao | H04W 24/02 |

OTHER PUBLICATIONS

Carroll et al. "Task Similarity Measures for Transfer in Reinforcement Learning Task Libraries" Brigham Young University BYU Scholars Archive, Proceedings of International Joint Conference on Neural Networks, Montreal, Canada, Jul. 31-Aug. 4, 2005, pp. 803-808.

Taylor et al. "Transfer Learning for Reinforcement Learning Domains: A Survey" Journal of Machine Learning Research 10 (2009) 1633-1685.

International Search Report and the Written Opinion of the International Searching Authority, issued in corresponding International Application No. PCT/IB2019/051544, dated Nov. 5, 2019, 12 pages.

Baxter "A Model of Inductive Bias Learning" Journal of Artificial Intelligence Research 12 (2000) 149-198.

Shi et al. "Actively Transfer Domain Knowledge" ECML PKDD 2008, Part II, LNAI 5212, pp. 342-357, 2008.

O'Shea et al. "An Introduction to Deep Learning for the Physical Layer" IEEE Transactions On Cognitive Communications and Networking, vol. 3, No. 4, Dec. 2017, pp. 563-575.

Torrey et al. "Transfer Learning" University of Wisconsin, Madison WI, USA, 2009, 22 pages.

Marx et al. "Transfer Learning with an Ensemble of Background Tasks" 2005, 4 pages.

Dai et al. "Transferring Naive Bayes Classifiers for Text Classification" Association for the Advancement of Artificial Intelligence, 2007, pp. 541-545.

\* cited by examiner

700

900

1100

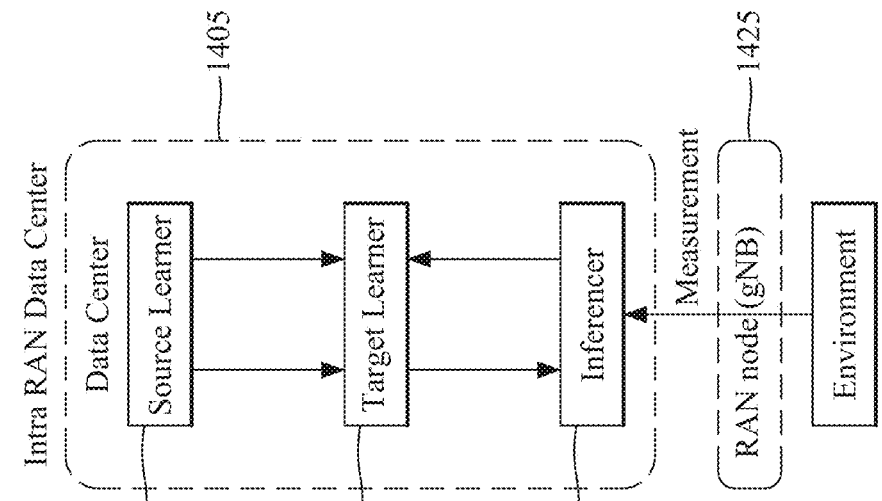
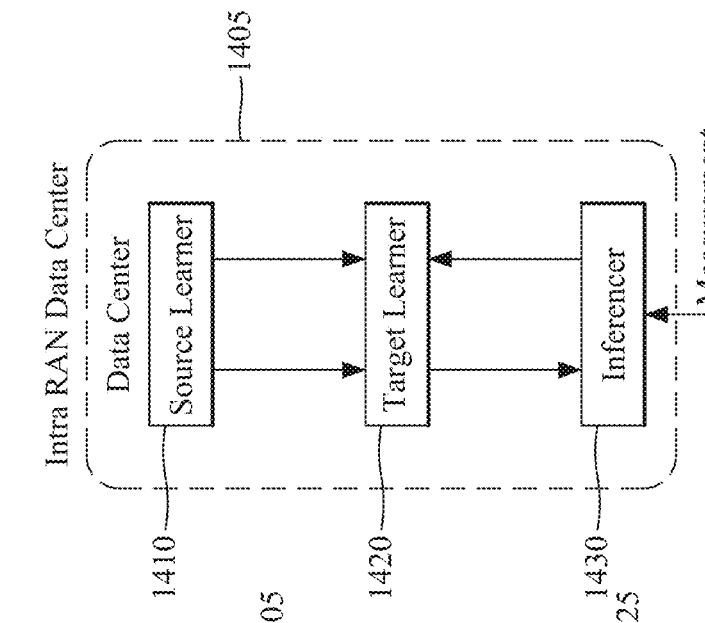
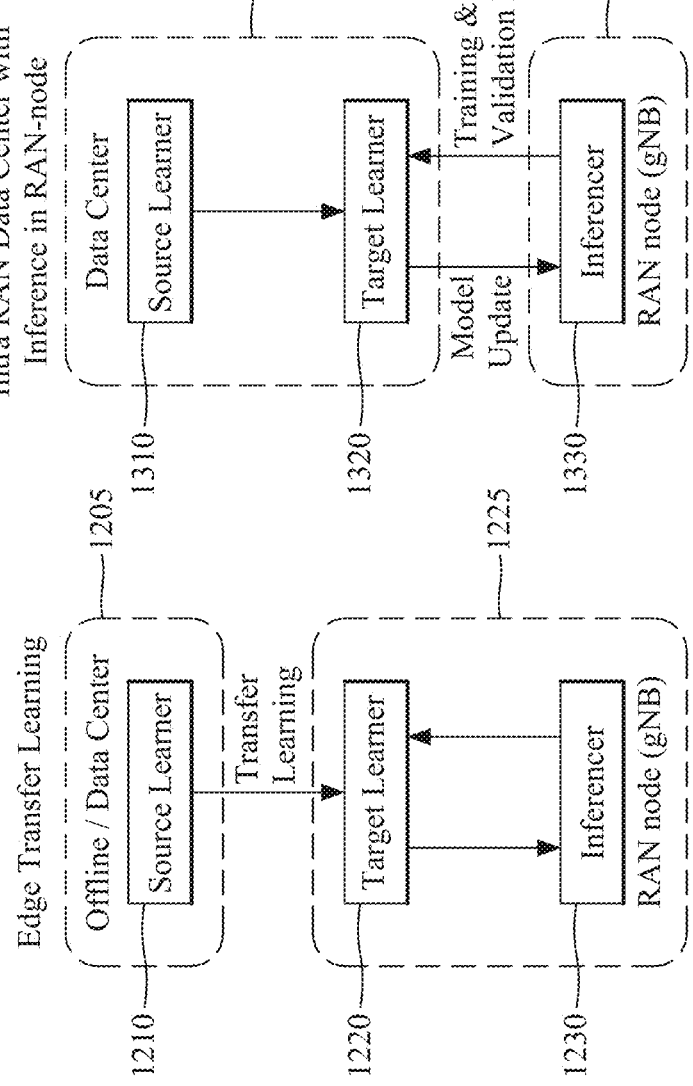

METHOD AND DEVICES FOR TRANSFER LEARNING FOR INDUCTIVE TASKS IN RADIO ACCESS NETWORK

CROSS REFERENCE TO RELATED APPLICATION(S)

This application is a 35 U.S.C. § 371 National Phase Entry Application from PCT/IB2019/051544, filed Feb. 26, 2019, designating the United States, the disclosure of which is incorporated herein by reference in its entirety.

TECHNICAL FIELD

Embodiments of the subject matter disclosed herein relate to transfer learning in a radio access network (RAN); more precisely, to a transfer learning (TL) framework (i.e., entities and signaling mechanisms) for inductive tasks such as prediction of a certain network metric or measurement, classifying a network-related phenomenon, detection of an event or network status in RAN.

BACKGROUND

Recent advances in the area of machine learning (ML) have stirred RAN developers' interest. Advanced ML techniques may be effective in complex communication scenarios difficult to describe with tractable mathematical models (e.g., unknown channel models). An inductive machine learning task aims to induce a model for predicting RAN evolution from a set of training information.

The article, "An Introduction to Deep Learning for the Physical Layer," by T. O'Shea and J. Hoydis, in *IEEE Transactions on Cognitive Communications and Networking*, Vol. 3, No. 4, December 2017, pp. 563-575, describes several physical layer scenarios where a deep inductive learning framework could be successful. In a transmitter, the channel and the receiver are modeled as a neural network, which can be trained as autoencoders and then used in situations where the true distribution of the underlying channels is unknown and existing classical methods are not able to perform adequately.

Although most ML algorithms are developed to address a single inductive task, inductive learning techniques across different tasks have been researched. As discussed in the section, "Transfer Learning," by L. Torrey and J. Shavlik in the *Handbook of Research on Machine Learning Applications*, IGI Global, 2009, edited by E. Soria, J. Martin, R. Magdalena, M. Martinez & A. Serrano, TL may enable reusing knowledge learned from a source task to improve the learning efficiency of a target task, instead of learning the target task from scratch.

In inductive learning techniques, knowledge elements may be transferred across different tasks. For example, in the article, "A model of inductive bias learning," by J. Baxter in the *Journal of Artificial Intelligence Research*, No. 12, 2000, pp. 149-198, a class of hypothesis space is transferred between source and target tasks. The best hypothesis space for the target task is selected by determining which hypothesis gives the best generalization error among a set of source tasks generated for each of the hypotheses.

In the article, "Transfer learning with an ensemble of background tasks," by Marx et al. in *NIPS Workshop on Transfer Learning*, 2005, a Bayesian transfer method is used in the context of logistic regression classifiers. Normally, a Gaussian prior with a mean and variance selected through cross-validation is used in these classifiers. For the transfer problem, the mean and variance of the target task are estimated by averaging over source tasks. The article, "Transferring Naive Bayes classifiers for text classification," by W. Dai et al. in the *AAAI Conference on Artificial Intelligence*, 2007, pp. 540-545, discusses TL compensating for the small amount of target task data. Leveraging on the potential benefit of Bayesian learning in the stability of prior distributions despite the absence of a large dataset, the authors estimate priors from related source tasks, which prevents overfitting due to limited available data at the target task.

The article, "Actively transfer domain knowledge," by X. Shi et al. in the *European Conference on Machine Learning*, 2008, considers TL in the context of unsupervised and semi-supervised settings. In this case, a target task with a large amount of data was available, but the data was largely unlabeled because the labeling mechanism was expensive. The article proposes an active learning approach, in which the target-task learner requests labels only when necessary. This approach works as a classifier with labeled data. The source data is used to estimate the confidence with which the classifier could label the unknown data. A label provided by an expert was requested only if the confidence was low.

The effectiveness of TL in inductive tasks depends very much on the relationship between source and target tasks. If the relationship is strong, then the transfer method can take advantage of it to significantly improve performance in the target task through transfer. Various approaches to prevent performance degradations due to TL are considered in the section, "Transfer Learning," by L. Torrey and J. Shavlik.

Although principles of TL in inductive domain and associated performance-gain promises are known, the specific mechanisms of TL in RANs have not been investigated. Existing RAN algorithms are typically tailored-made to solve a specific task (in a manner similar to design methods) and are not made to be reused for other tasks. Existing ML frameworks do not support generalization across different tasks (i.e., for a given ML task in RAN, it is not known how to transfer parts of the source solution, such as trained models, prior distributions, to a target task).

There is an unfulfilled need to develop methods and devices for implementing transfer inductive learning in RANs.

Abbreviations used in this document and their explanations are listed below:
BLER Block Error Rate
gNBs next generation NodeB
KPI Key Performance Indicator
ML Machine Learning
QOS Quality of Service
RAN Radio Access Network
RAT Radio Access Technology
RSRP Reference Signal Received Power
RSRQ Reference Signal Received Quality
SINR Signal to Interference plus Noise Ratio (PLEASE CONFIRM)
SIPs Source Inductive Parameters
SVMs Support Vector Machines
TA Timing Advance
TL Transfer Learning
UE User Equipment

SUMMARY

The proposed method and devices address various aspects of implementing TL in RANs. It is provided for transferring algorithmic parameters across different inductive tasks possibly residing on different network units, in a structured way, so that they could be used by a target learning task. The signaling across different RAN nodes necessary for accomplishing TL is designed.

According to an exemplary embodiment, there is a network operator device performing as a source learner in a RAN having a communication interface configured to intermediate communication with a target learner in the RAN and a connected to the communication interface. The data processing unit is configured to prepare and supply SIPs, via the communication interface to the target learner. The SIPs enable the target learner to generate a production model of a RAN inductive task for an inference entity.

According to another embodiment, there is a method for a network operator device in RAN. The method includes preparing SIPs, and supplying the SIPs to a target learner in the RAN, the SIPs enabling the target learner to generate a production model of a RAN inductive task for an inference entity in the RAN.

According to yet another embodiment there is a computer recording medium storing executable codes that, when executed on a network operator device in a RAN makes the network operator device to prepare and supply SIPs to a target learner, the SIPS enabling the target learner to generate a production model of a RAN inductive task for an inference entity in the RAN.

According to another embodiment, there is a program product causing a network operator device in a RAN to prepare and supply SIPs to a target learner in the RAN, the SIPs enabling the target learner to generate a production model of a RAN inductive task for an inference entity in the RAN.

According to another embodiment, a network operator device performing as a source learner in a RAN includes a first module configured to prepare SIPs, and a second module configured to supply the SIPs to a target learner. Here too, the SIPs enable the target learner to generate a production model of a RAN inductive task for an inference entity in the RAN.

According to another embodiment there is a network operator device performing as a target learner in the RAN. The network operator device has a communication interface configured to intermediate communication with a source learner and an interference entity, and a data processing unit connected to the communication interface. The data processing unit is configured to receive via the communication interface from the source learner, to use the SIPs for generating a production model of a RAN inductive task, and to transmit the production model to the inference entity.

According to yet another embodiment, there is a method for a network operator device in a RAN. The method includes receiving SIPs from a source learner, generating a production model of a RAN inductive task using the SIPs, and transmitting the production model to an inference entity in the RAN.

According to another embodiment, there is a computer readable recording medium storing executable codes that, when executed on a network operator device in a RAN, make the network operator device to generate a production model of a RAN inductive task using SIPs received from a source learner in the RAN, and to transmit the production model to an inference entity in the RAN.

According to another embodiment, there is a program product causing a network operator device in a RAN to generate a production model of a RAN inductive task using SIPs received from a source learner in the RAN and to transmit the production model to an inference entity in the RAN.

According to another embodiment, there is network operator device performing as a target learner in a RAN. The Network operator device includes a first module configured to receive SIPs, from a source learner, a second module configured to generate based on the SIPs a production model of a RAN inductive task, and a third module configured to transmit the production model to an inference entity.

According to yet another embodiment, there is a network operator device performing as an inference entity in a RAN. The network operator device has a communication interface configured to intermediate communication via RAN, and a data processing unit connected to the interface. The data processing unit is configured to receive a production model of a RAN inductive task from a target learner, to produce input for the production model from RAN-related parameters, to execute the production model of the RAN inductive task using the input to yield an output related to a RAN function, and to use the output to determine the RAN function.

According to another embodiment, there is a method for a network operator device performing as an inference entity. The method includes receiving a production model of a RAN inductive task from a target learner, producing input for the production model from RAN-related parameters, executing the production model of the RAN inductive task using the input, to yield an output related to a RAN function, and using the output to determine the RAN function.

According to yet another embodiment, there is a computer readable recording medium storing executable codes that, when executed on a network operator device in a radio access network, RAN, make the network operator device to produce input for a production model of a RAN inductive task based on RAN-related parameters, to execute the production model of the RAN inductive task using the input to yield an output related to a RAN function, and to use the output to determine the RAN function. Here, the production model is received from a target learner that generates the production model based on SIPs received from a source learner in the RAN.

According to another embodiment there is a program product causing a network operator device in a RAN to produce input for a production model of a RAN inductive task based on RAN-related parameters, to execute the production model of the RAN inductive task using the input to yield an output related to a RAN function, and to use the output to determine the RAN function. The production model is received from a target learner that generates the production model based on SIPs received from a source learner in the RAN.

According to yet another embodiment, there is a network operator device performing as an inference entity is a RAN. The network operator device has a first module configured to receive a production model of a RAN inductive task from a target learner, a second module configured to produce input for the production model from RAN-related parameters, a third module configured to execute the production model of the RAN inductive task using the input to yield an output related to a RAN function, and a fourth module configured to use the output to determine the RAN function.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 12 illustrates a deployment scenario according to an embodiment;

FIG. 13 illustrates another deployment scenario according to another embodiment; and FIG. 14 illustrates yet another deployment scenario according to yet another embodiment.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

The following embodiments set forth a general-purpose TL framework for inductive tasks in RANs. The framework includes various entities employed in implementing TL in the RAN architecture. The different entities can be integrated into RAN functional components of existing or future standard releases. The signaling mechanism between the different framework entities can also be integrated into network interfaces of existing or future standard releases. The TL framework is generic in the sense that it can be reused by multiple inductive tasks to yield a variety of outcomes, such as predictions of some network phenomena or to improve certain KPIs in the network. Note that "source learner" and "source," "target learner" and "target," "inference entity" and "inference" are terms interchangeably used in this description. These entities are combinations of software and hardware configured to operate as described for the different embodiments.

An inductive task in RAN is any of a variety of ML applications, including prediction of a certain network metric (e.g., certain KPI) or measurement (e.g., positioning parameters based on some other network measurement), classifying a network-related phenomenon (e.g., user or traffic type), or detection of an event or network status (e.g., sleeping cells, fraudulent usage of the network), to name a few.

Figure 1:
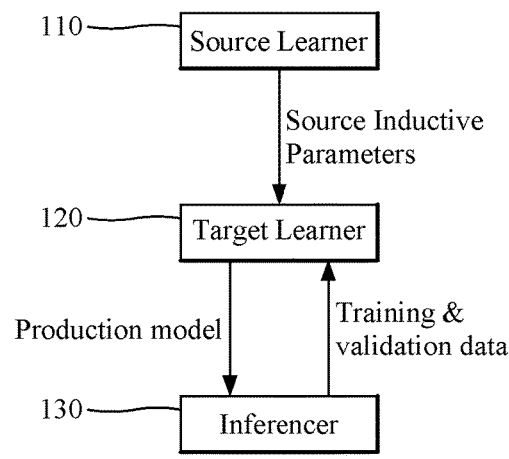
FIG. 1 is a block diagram illustrating transfer inductive learning in RAN according to an embodiment.

FIG. 1 schematically illustrates the logical entities (each of which encompasses both hardware and software) and signals (information) exchanged there-between for transfer learning in RAN and modelling inductive tasks in RAN.

An inductive learning task performed by a target learner 120 is using input information (SIPs) received from a source learner 110. The inductive learning task's output is a production model fed to a specific RAN application performed by inference entity 130. The SIPs may include standard (e.g., L1/L2/L3) network measurements describing the status of the network, users, traffic, or KPIs (e.g., RSRP, SINR, RSRQ, TA, resources assigned to a UE, spectral efficiency, throughput, type and amount of traffic sent at a time to one or more users, etc.), either in raw or aggregate format such as averages, median, variance, etc. The inductive learning task then outputs that may include predictions, labels, model updates or descriptions related to the specific RAN application, collectively named production model.

A source learner 110 is configured to prepare, maintain (i.e., store and update) SIPs. SIPs may include machine learning models (neural networks, decision forests, regression models, etc.), functions such as prior distribution functions, subsets of training data, etc. The source learner 110 transfers the SIPs to a target learner 120. Table 1 is a non-exhaustive list of SIPs and production models.

TABLE 1

| | Source | Target |
|---|---|---|
| 1. | An inductive model | A model for another inductive task |
| 2. | An inductive task involving a cell type (e.g., a Macro cell) | The same task on another cell type (e.g., prediction of a KPI in a Pico cell) |
| 3. | An inductive model generated from data of multiple cells | An inductive model for a specific cell |
| 4. | An inductive model generated from simulated data | An inductive model for the same task but using real network data |
| 5. | An inductive model trained by using a high volume of correlated low-cost sources of data | An inductive model using less available, often more precise, high-cost data |
| 6. | An inductive model trained by using offline available data | An inductive model to be run on the live network |
| 7. | A model for a 5G inductive task trained on 4G data | A model for a 5G inductive task that uses 5G data |

An example of a source inductive model in item 1 of Table 1 is an ML model for predicting a certain time-series KPI, and the corresponding inductive target task is generating a model for predicting a time-series for a related but different KPI. An example of a high volume of correlated low-cost sources of data in item 5 of Table 1 is a set of normal measurements that are typically collected in the network, such as radio measurements indicating the signal strength and interference level. The more precise, high-cost data are measurements that normally require a specific subscription to be collected, such as accurate positioning measurements for UEs.

Figure 2:
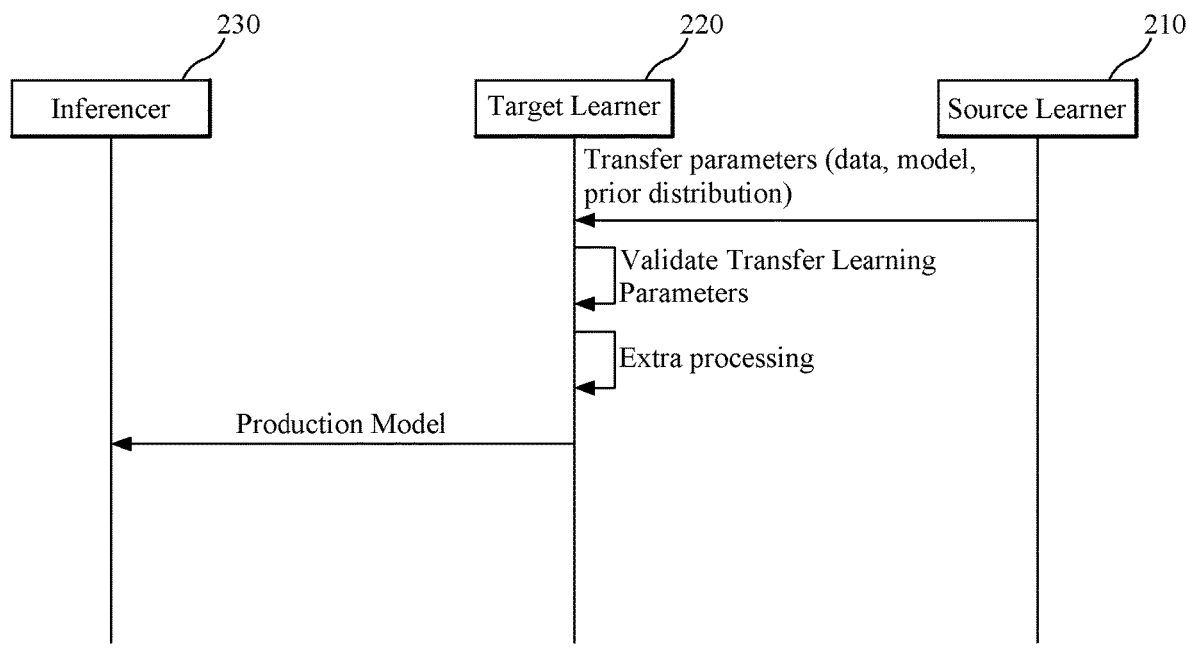
FIG. 2 illustrates a transfer inductive learning scenario according to an embodiment.

The target learner 120 is an entity responsible for receiving SIPs such as source models, functions, or data, etc., from the source learner 110. SIPs may include structure and weights of a neural network, a decision forest, etc. The target learner may validate a received parameter (model) according to some suitable criteria. The target learner outputs the production model (possibly after validation) to an inference entity. FIG. 2 illustrates a scenario (time running from top to bottom) according to which transfer parameters sent from a source learner 210 to a target learner 220 are validated and further processed before being provided as a production model to an inference entity 230.

In some embodiments, the source learner trains and/or validates SIPs. One example is a source learner preparing (and including in the SIPs) a predictive model for generic radio cells.

Figure 3:
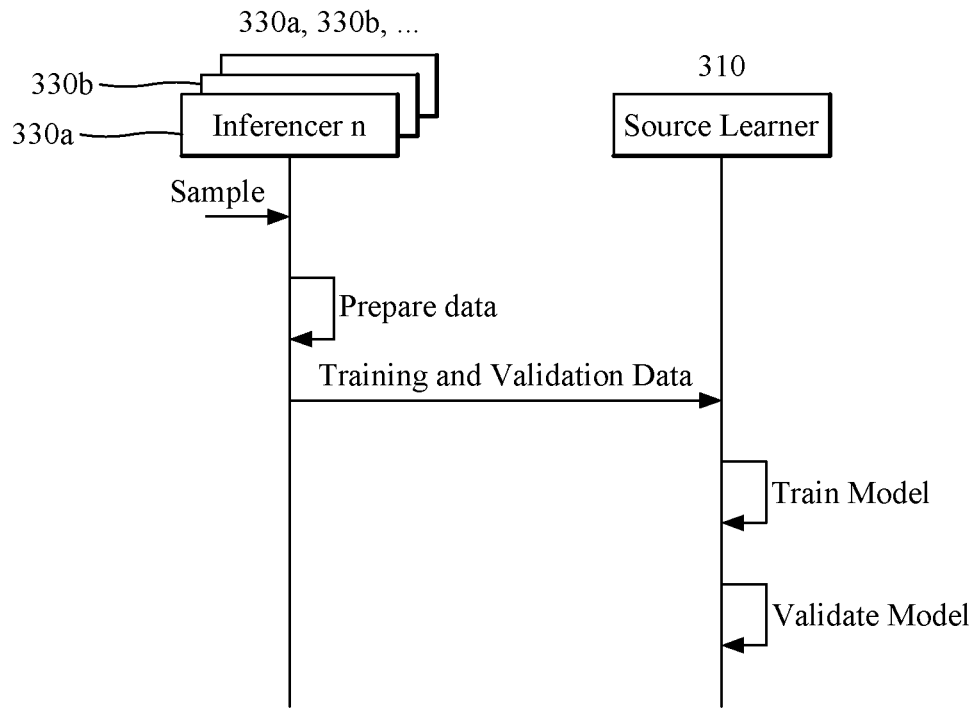
FIG. 3 illustrates a scenario in which the source learner collects training and validation data directly from inference units according to an embodiment.

In some embodiments, the target learner provides feedback information to the source learner to enable the source learner to prepare SIPs for another target learner (possibly at some other parts of the network). The target learner may collect feedback information from plural inference entities. However, the source learner 310 may collect training and validation data directly from relevant inference units 330a, 330b, etc. (e.g., cells(s)) as illustrated in FIG. 3.

In some embodiments, the target learner maintains (e.g., stores and/or updates) and improves received SIPs. For example, the target learner may progressively update one or more parameters via training. The target learner may receive various information useful for the inductive task, such as a set of measurements describing current or past network status, users, traffic, or KPIs (e.g., RSRP, SINR, RSRQ, TA, resources assigned to a UE, spectral efficiency, throughput) either in raw or aggregate format such as averages, median, variance, etc., type and amount of traffic sent at a time to a user, acknowledgment received upon delivery of data packets, etc. Such information is typically sent by an inference entity either at once or in a series of smaller batches and might be used for training and validation. In some embodiments, a target learner may receive mentioned information from other entities (e.g., a logger unit or tailor-made logging applications residing is some RAN physical entities such as cells, gNBs, etc.).

Training may be done using methods employing one or more ML techniques (such as artificial neural networks, decision forests, SVMs, etc.) numerical optimization algorithms (such as variants of gradient descent, Broyden-Fletcher-Goldfarb-Shanno algorithm or higher order methods, such as Newton).

In some embodiments, a target learner sends a request to an inference entity for receiving its running (in production) inductive model. The target learner may use the model received in response from the target entity for validation of a new (retrained) model using some suitable criteria. The target learner may validate an inductive model using information describing a history of network operations, users, traffic, KPIs, specific events, etc., provided earlier by one or more inference entities or other network entities. This information is similar in nature to the information used for training, but it is a separate set of data (which has not been previously used for training) reserved for validation.

Figure 4:
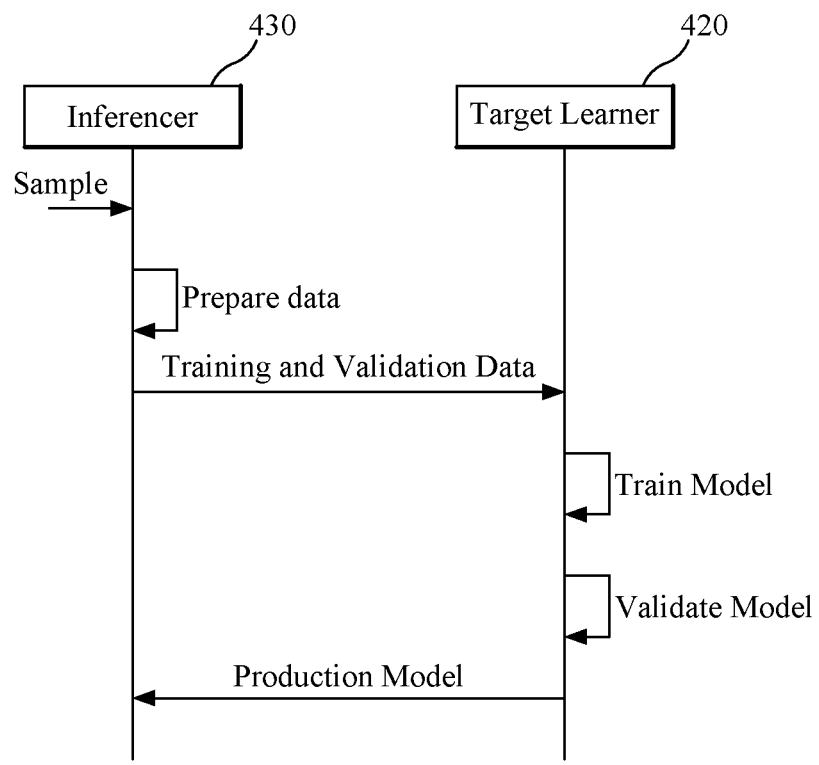
FIG. 4 illustrates a scenario in which the target learner performs an ML-based training using data received from an inference entity according to an embodiment.

The target learner generates a production model that may include SIPs or models therein either in their original form as received from the source learner or refined by further training and/or after validation. FIG. 4 illustrates a scenario in which the target learner 420 performs an ML-based training of an inductive model based on training and validation data received from inference entity 430 and then returns an updated model to inference entity 430.

The inference entity is a logical entity that executes the inductive task and generates RAN-relevant outputs. In some cases, the inference entity receives input information from other network entities in addition to the production model received from the target learner. The inference entity then performs an inference based on said information. The RAN-relevant output may be a prediction of a certain network metric (e.g., certain KPI) or measurement (e.g., positioning parameters based on some other network measurement), classifying a network-related phenomenon (e.g., user or traffic type), detection of an event or network status (e.g., sleeping cells, fraudulent usage of the network), etc.

In some embodiments, the RAN-relevant output triggers some consequent actions. Examples of such actions are adjusting (selecting or setting a target value) for a certain network parameter such as BLER in link adaptation procedure, downlink or uplink transmit power budget, time-frequency-space resource allocation variables, handover threshold, beam selection variable, etc. The action is then transmitted to a network node controlling these RAN parameter(s). The RAN-relevant output may predict an error event (e.g., sleeping cells, fraudulent behavior of some adversarial user in the network, etc.).

The inference entity receives an inductive model from the target learner. The inference entity may store the received model in an internal memory. The inference entity may also perform some calculations to validate the received model and may replace or update its currently used model (prior to receiving the inductive model) with the received (optionally also updated) model. In some embodiments, the inference entity may receive a request for sending its current production model or other feedback information to the target learner.

The inference entity may record input information it uses in the model execution in some suitable format. This information may be stored and used for calculations performed later by the inference entity. Such information may, for example, be later used for training and validation purposes. In some cases, the inference entity may later send the recorded information to a target learner and/or a source learner using adequate formats and mechanisms. In some embodiments, the inference entity may send the information to an additional entity (e.g., a logging unit) possibly in an asynchronous manner. The additional entity then may pair different pieces of the received data and forward it to the target learner and/or source learner. In some embodiments, the inference entity may send additional data, such as unique keys, together with recoded data to the additional entity to facilitate the pairing of data pieces together.

In some embodiments, the inference entity resides in a distributed network entity such as a gNB with one or more co-located or non-co-located cells. In the latter case, some of the model input data has to be transmitted between the inference entity (residing in the controlling gNB) and remote radio units using suitable intra-RAN interfaces.

In some other embodiments, the inference entity resides in a network entity higher up (e.g., in L3 control entities) having access to data from several distributed RAN nodes (e.g., gNBs). In one embodiment, the inference entity resides in a network entity outside the RAN node (e.g., an inference unit in L3) and uses input information for executing its models that are not generated inside the RAN (e.g., including type of traffic bearers intended for one or more users, metrics related to QOS, network KPIs generated on L3 or higher, etc.).

The various embodiment combinations of a source learner, a target learner and an inference entity form a logical TL framework for inductive tasks in the context of RANs. The functionality of each entity might be split further into smaller modules without compromising the overall functionality of the entities as described. This, for example, may occur for refined design purposes such as modularization. Training is one example of functionality that may be isolated from the other functionalities within a target or source learner.

The source and target learner may be merged into one entity because they share some basic functionality, such as sending models or performing training.

Figure 5:
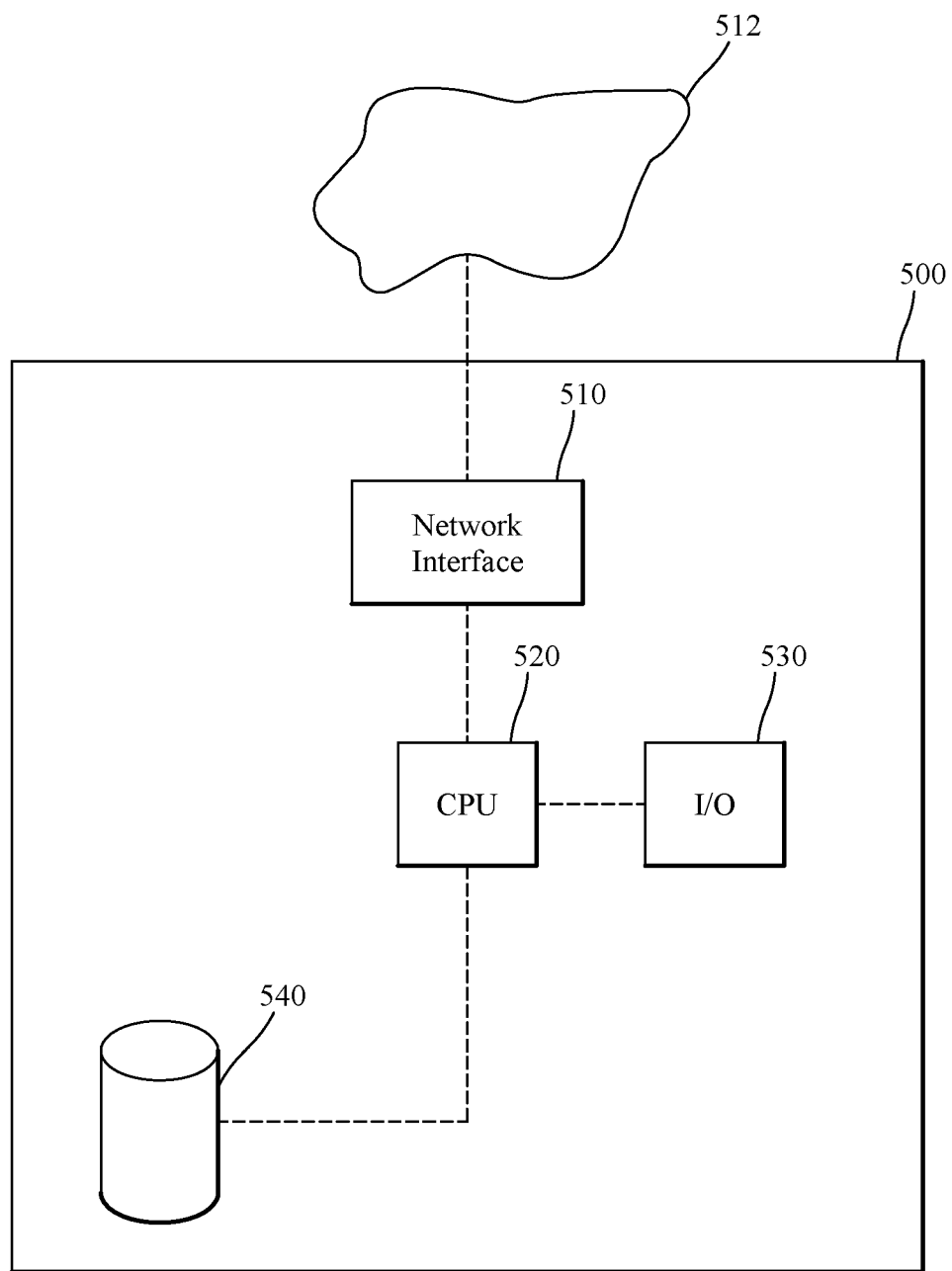
FIG. 5 is a block diagram of an apparatus usable as a network operator device according to an embodiment.

As previously mentioned, the various embodiments of the source learner, the target learner and the inference entity are a combination of hardware and software. FIG. 5 illustrates an apparatus 500 used as a network operator device providing hardware support to software, making it operate as a logic unit for the source learner, the target learner and/or the inference entity. Apparatus 500 communicates with RAN 512 via an interface 510. The various operations related to a source learner's, target learner's and/or inference entity's functionality are performed by data processing unit 520 including one or more processors. Optionally, a separate I/O interface 530 enables interaction with a programmer. Apparatus 500 may include a data storage unit 540 that may store (1) executable codes making the data processing unit 520 perform various transfer inductive learning methods and/or (2) other data, models, parameters, etc.

According to an embodiment, apparatus 500 performs as a source learner (e.g., 110 in FIG. 1, or 210 in FIG. 2) with interface 512 being configured to intermediate communication with a target learner (e.g., 120 in FIG. 1, or 220 in FIG. 2). The data processing unit 520 is in this embodiment configured to prepare and supply SIPs to the target learner via the communication interface 512, with the SIPs enabling the target learner to generate a production model of a RAN inductive task for an inference entity (e.g., 130 in FIG. 1 or 230 in FIG. 2) in the RAN. The SIPs may include:
- an inductive model of an inductive task different from the RAN inductive task;
- an inductive model of a task for a cell of a first type while the RAN inductive task is for a cell of a second cell type;
- an inductive model generated from data related to multiple cells, and the production model is for a specific cell; and/or
- an inductive model trained using first data while the production model is trained using second data which is different from the first data.

Here, the first data may be simulated network data and the second data is real network data; the first data may be a high volume of correlated low-cost data, and the second data is a low volume of more precise and expensive data than the high volume of correlated low-cost data; the first data may be offline available network data and the second data online network data; and/or the first data may be 4G data, the inductive model being related to a 5G inductive task, and the second data 5G data.

Data processing unit 520 may further be configured to train models included in SIPs and/or validate SIPs using data from the RAN.

The RAN inductive task may be an ML application predicting a certain network metric or measurement, classifying a network-related phenomenon or detecting an event or network status.

Figure 6:
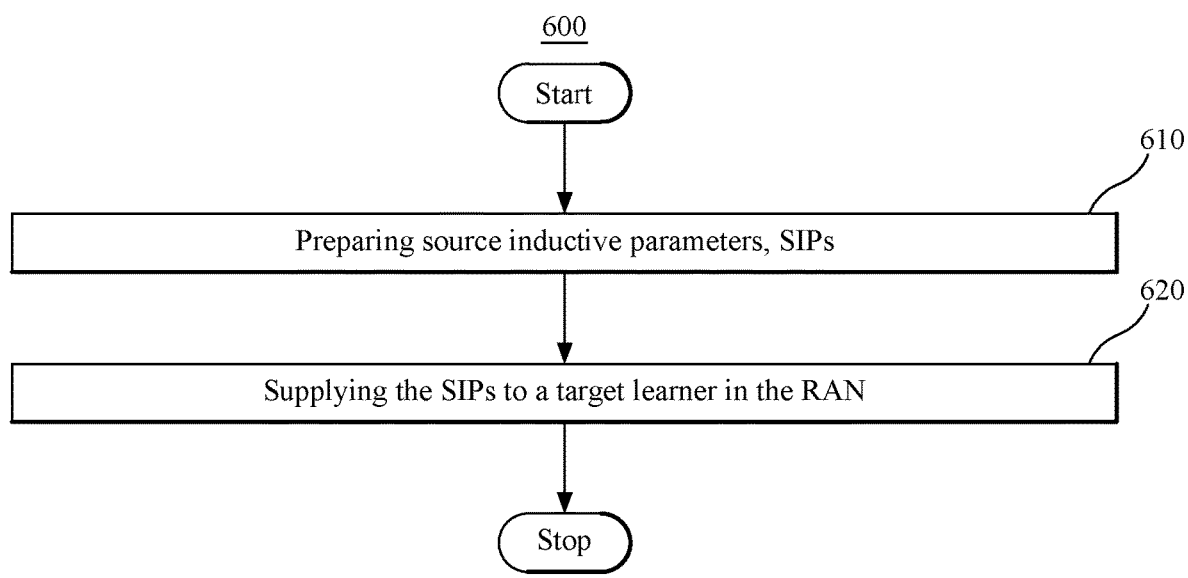
FIG. 6 is a flowchart for a source learner method according to an embodiment.

FIG. 6 is a flowchart of a method 600 making a network operator device in a RAN to operate as a source learner. Method 600 includes preparing SIPs at 610 and supplying the SIPs to a target learner in the RAN at 620. The SIPs enable the target learner to generate a production model of a RAN inductive task for an inference entity in the RAN.

Figure 7:
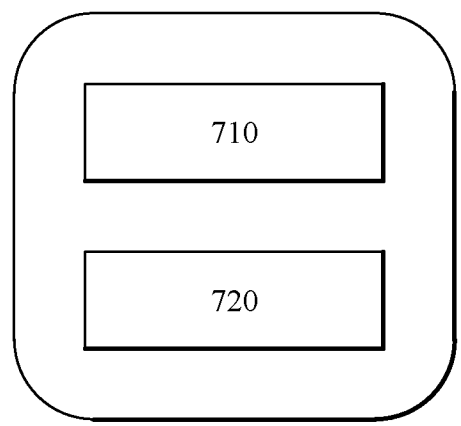
FIG. 7 is a network operator device functioning as a source learner according to another embodiment.

FIG. 7 illustrates a block diagram of a network operator device 700 operating as a source learner according to another embodiment. Network operator device 700 includes a first module 710 configured to prepare source inductive parameters, SIPs, and a second module 720 configured to supply the SIPs to the target learner. Here again, the SIPs enable the target learner to generate a production model of a RAN inductive task for an inference entity (130, 230) in the RAN.

According to another embodiment, apparatus 500 may be configured to perform as a target learner (e.g., 120 in FIG. 1 or 220 in FIG. 2) in RAN 512. Interface 512 is configured to intermediate communication with a source learner (e.g., 110 in FIG. 1 or 210 in FIG. 2) and an inference entity (e.g., 130 in FIG. 1 or 230 in FIG. 2) in the RAN. Data processing unit 520 is configured to receive SIPs from the source learner, to use the SIPs for generating a production model of a RAN inductive task, and to transmit the production model to the inference entity via the communication interface. As also discussed for the source learner, the SIPs may include an inductive model of an inductive task different from the RAN inductive task; an inductive model of a task for a cell of a first type while the RAN inductive task is for a cell of a second cell type; an inductive model generated from data related to multiple cells, and the production model is for a specific cell; and/or an inductive model trained using first data while the production model is trained using second data which is different from the first data. Here, the first data is simulated network data and the second data is real network data; the first data is a high volume of correlated low-cost data, and the second data is a low volume of more precise and expensive data than the high volume of correlated low-cost data; the first data is offline available network data and the second data is online network data; and/or the first data is 4G data, the inductive model being related to a 5G inductive task, and the second data is 5G data.

The data processing unit may further be configured to receive training and validation data from the inference entity and/or other entities in the RAN, and to enhance the production model using the training and validation data.

Figure 8:
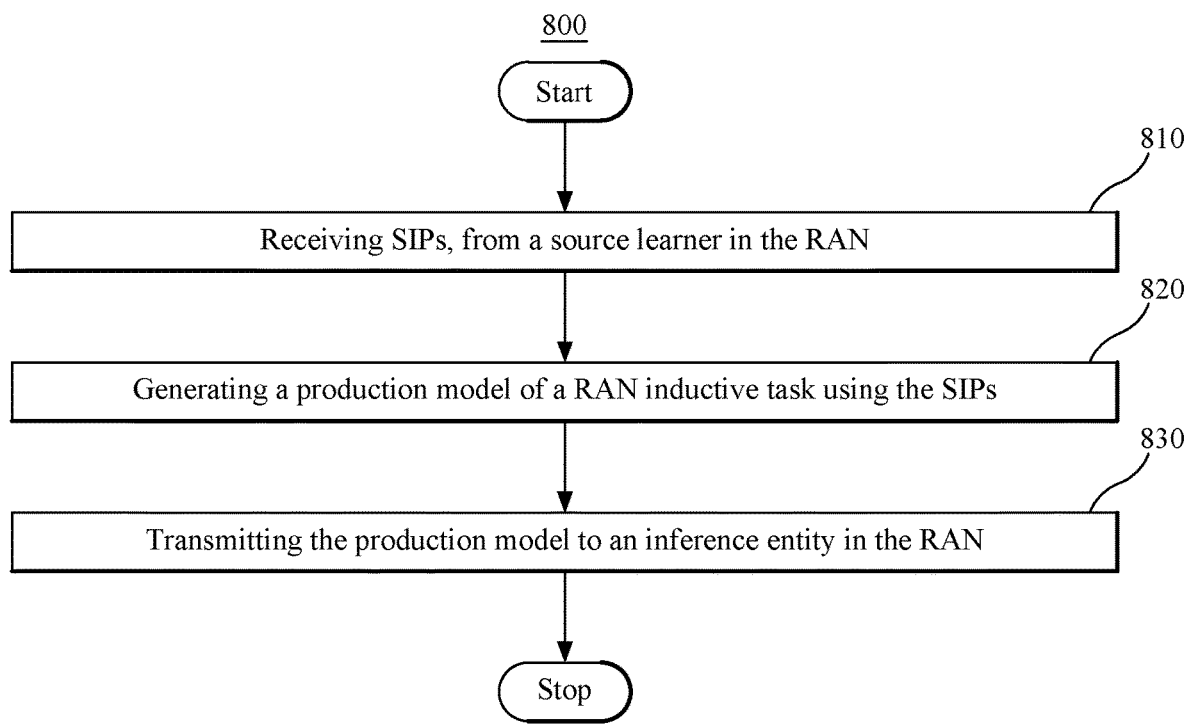
FIG. 8 is a flowchart for a target learner method according to an embodiment.

FIG. 8 is a flowchart of a method 800 making a network operator device in a RAN operate as a target learner. Method 800 includes receiving SIPs from a source learner in the RAN at 810, generating (820) a production model of a RAN inductive task using the SIPs at 820, and transmitting the production model to an inference entity in the RAN at 830.

Figure 9:
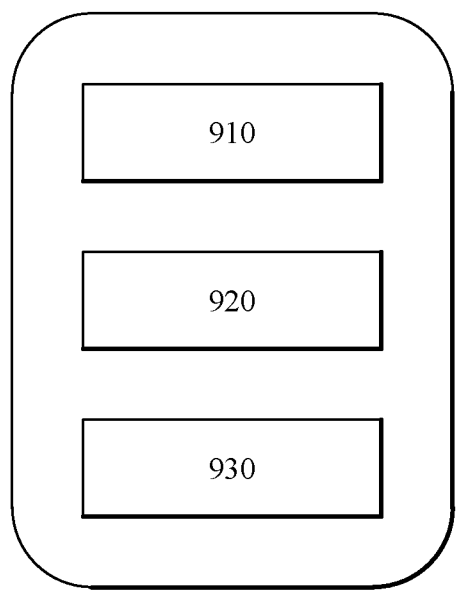
FIG. 9 is a network operator device functioning as a target learner according to another embodiment.

FIG. 9 illustrates a block diagram of a network operator device 900 operating as a target learner according to another embodiment. Network operator device 900 includes a first module 910 configured to receive SIPs from a source learner (e.g., 110 in FIG. 1 or 210 in FIG. 2), a second module 920 configured to generate based on the SIPs a production model of a RAN inductive task, and a third module 930 configured to transmit the production model to an inference entity (e.g., 130 in FIG. 1 or 230 in FIG. 2). Here again, the SIPs enable the target learner to generate a production model of a RAN inductive task for an inference entity (130, 230) in the RAN.

According to yet another embodiment, apparatus 500 performs as an inference entity (e.g., 130 in FIG. 1, or 230 in FIG. 2), interface 512 being configured to intermediate communication with a target learner (e.g., 120 in FIG. 1, or 220 in FIG. 2). Data processing unit 520 is to receive a production model of a RAN inductive task from a target learner, to produce input for the production model from RAN-related parameters, to execute the production model of the RAN inductive task using the input to yield an output related to a RAN function, and to use the output to determine the RAN function.

Figure 10:
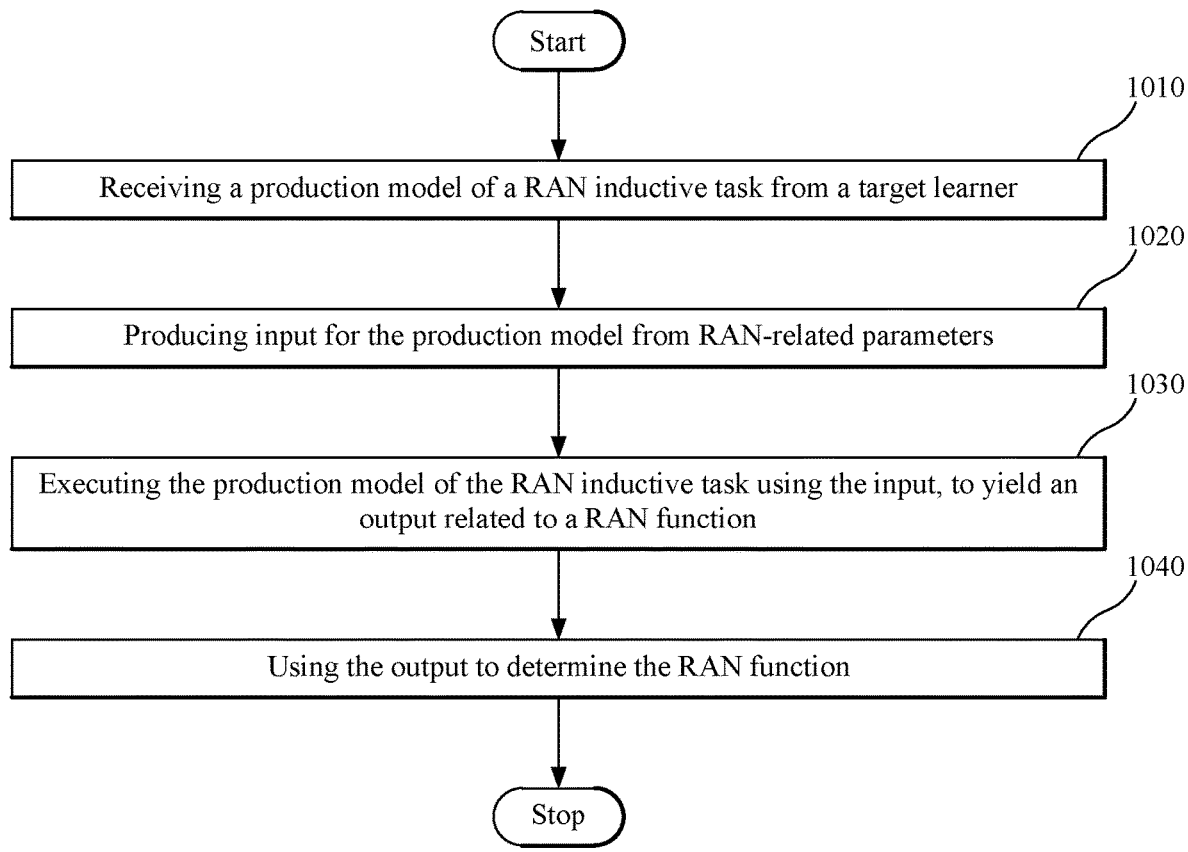
FIG. 10 is a flowchart for an inference entity method according to an embodiment.

FIG. 10 is a flowchart of a method 1000 making a network operator device in a RAN to operate as an inference entity. Method 1000 includes receiving a production model of a RAN inductive task from a target learner at 1010, producing input for the production model from RAN-related parameters at 1020, executing the production model of the RAN inductive task using the input to yield an output related to a RAN function at 1030, and using the output to determine the RAN function at 1040.

Figure 11:
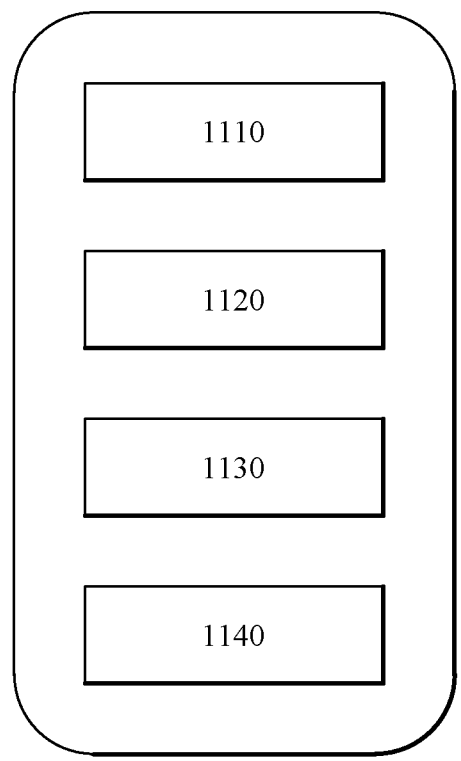
FIG. 11 is a network operator device functioning as an inference entity according to yet another embodiment.

FIG. 11 illustrates a block diagram of a network operator device 1100 operating as an inference entity according to another embodiment. Network operator device 1100 includes a first module 1110 configured to receive a production model of a RAN inductive task from a target learner, a second module 1120 configured to produce input for the production model from RAN-related parameters, a third module 1130 configured to execute the production model of the RAN inductive task using the input to yield an output related to a RAN function, and a fourth module 1140 configured to use the output to determine the RAN function.

The source learner, target learner and inference entity perform functionalities amenable to a certain level of virtualization and, therefore, can be mapped flexibly into various product variants. FIGS. 12-14 illustrate three deployment possibilities. From the deployment point of view and based on network functions, the term "function" is used hereinafter to refer to each of the TL entities (i.e., source learner, target learner and inference entity). Mapping between the TL entities and the network functions does not need to be one-to-one because each TL entity can be mapped into one or more network operator devices.

The Edge Transfer Learning TL scenario illustrated in FIG. 12 divides the TL framework into source learner 1210 being located in a data center 1205 that may be temporarily offline, whereas the rest of framework functions (i.e., target learner 1220 and inference 1230) are deployed 1n the RAN node hardware 1225 (e.g., gNBs or higher RAN control nodes). The SIPs then can be produced either offline using some suitable infrastructure (e.g., production environment) or at a data center. As such, the SIPs are sent occasionally, possibly through software updates to the target learner located at RAN-nodes, which impose modest overhead in terms of signaling and bandwidth. Note that in this case, the target learner and/or inference entity may be hosted in generic multi-core or special-purpose digital signal processing hardware, possibly in different layers (e.g., L1, L2 or L3).

The intra RAN data center with inference entity in RAN-node TL scenario is illustrated in FIG. 13. According to this scenario source learner 1310 and target learner 1320 are deployed at a data center 1305, whereas the inference entity 1330 is deployed at a RAN-node 1325. There are different ways to implement data center functionality, such as cloud-based services with commodity hardware including CPUs and/or GPUs. The source and target learners therefore can flexibly be implemented either in a central or distributed manner in cloud premises. The model updates are sent to the inferencer at the RAN-node. Training and validation data are sent from the RAN-node to a data center. Such information might be sent in batches and in a best-effort manner (i.e., not latency sensitive). Although messaging overhead of this deployment scenario is higher compared to the scenario in FIG. 12, the computational burdens on the RAN-nodes are less restrained in this scenario because training is pushed to the data center and RAN-nodes only perform inference. Moreover, in this scenario, the learners enjoy more flexibility in terms of deployment compared to the first scenario.

Finally, an intra RAN data center deployment scenario is illustrated in FIG. 14. In this case, the inference is deployed outside physical RAN-nodes in data center 1405. TL functions then enjoy extreme flexibility in terms of implementation and deployment. The source and target learner and the inferencer can be deployed in either a central or distributed manner using cloud concepts. In this way, no training and inference is performed at RAN-node hardware. The measurement information specifying the status of the network (e.g., radio measurements describing the current state of network such as RSRP, SINR, RSRQ, TA, etc.) has to be sent from RAN-node to data center. This information is sent in one or multiple messages and possibly with different timing. The inference function residing at the data center is then responsible for collecting and matching such information together with other relevant information available at the inference function to prepare the input information for inference models as well as data batches used at training. As it appears, the signaling overhead and latency requirements in this TL scenario are more demanding compared to the other two cases.

The embodiments described in this section makes it possible to implement TL for inductive tasks in RANs, to harvest the potential benefits of TL. If a feature in the RAN is implemented by using inductive learning (e.g., a sleeping cell prediction use case) this TL framework brings performance benefits compared to the traditional rule-based methods. One draw-back of ML-based solutions is the excessive amount of unbiased data needed to train the models. In some cases, the relevant data is collected progressively as the learning algorithm is deployed to real network. As a result, one expects relatively poor initial performance for the parts of the network (e.g., cells) where the ML feature is deployed first. The TL for inductive tasks in RANs makes it possible to mitigate initial performance degradations by transferring the learning based on data from other parts of the network (e.g., via another cell which is dimmed to have similar characteristics of the target cell such as traffic type, UE numbers and mobility pattern, etc.). Moreover, TL for inductive tasks in RANs also makes it possible to achieve to a high-performance target faster and by using less data than traditional model training in RANs.

One the other hand, TL is deployed in a structured manner, instead of implementing it case by case for different network features. Reusing framework entities for several use cases reduces the implementation cost, improve the development speed and efficiency and makes it easier to test and debug TL features. Finally, having a framework for TL, makes it is easy to improve the algorithmic aspects of the framework at once which leads into compound performance gains on multiple use cases.

The disclosed embodiments provide methods and systems associated with transfer inductive learning for radio access networks. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

As also will be appreciated by one skilled in the art, the embodiments may take the form of an entirely hardware embodiment or an embodiment combining hardware and software aspects. Further, the embodiments describe herein, e.g., systems and methods associated with charging in an IoT environment, may take the form of a computer program product stored on a computer-readable storage medium having computer-readable instructions embodied in the medium. For example, FIG. 5 depicts an electronic storage medium 540 on which computer program embodiments can be stored. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A network operator device performing as a source learner in a radio access network, RAN, the network operator device comprising:
   processing circuitry; and
   a memory containing instructions executable by the processing circuitry, the network operator device operative to:
   prepare source inductive parameters, SIPs; and
   supply the SIPs to a target learner in the RAN, wherein
      the SIPs include an inductive model of an inductive task,
      the SIPs enable the target learner to generate a production model of a RAN inductive task using the inductive model of the inductive task,
      the inductive task and the RAN inductive task are different,
      the target learner is configured to provide the production model to an inference entity in the RAN, and
      the target learner and the inference entity are different logical entities.

2. The network operator device of claim 1, wherein the inductive model is trained using first data and the production model is trained using second data which is different from the first data, and the first data and the second data is any one or more of:
   the first data is simulated network data, and the second data is real network data;
   the first data is a high volume of correlated low-cost data, and the second data is a low volume of more precise and expensive data than the high volume of correlated low-cost data;
   the first data is offline available network data and the second data is online network data; and
   the first data is 4G data, the inductive model being related to a 5G inductive task, and the second data is 5G data.

3. The network operator device of claim 1, wherein the network operator device is further configured to train models included in SIPs and/or validate SIPs using data from the RAN.

4. The network operator device of claim 1, wherein the RAN inductive task is a machine learning application predicting a certain network metric or measurement, classifying a network-related phenomenon or detecting an event or network status.

5. The network operator device of claim 1, wherein the source learner is part of a data center of the RAN.

6. A network operator device performing as a source learner in a radio access network, RAN, the network operator device comprising:
   processing circuitry; and
   a memory containing instructions executable by the processing circuitry, the network operator device operative to:
   prepare source inductive parameters, SIPs; and
   supply the source inductive parameters, SIPs to a target learner in the RAN, wherein
      the SIPs include an inductive model of an inductive task for a cell of a first cell type,
      the SIPs enable the target learner to generate a production model of a RAN inductive task using the inductive model of the inductive task,
      the inductive task and the RAN inductive task are different,
      the target learner is configured to provide the production model to an inference entity in the RAN, and
      the target learner and the inference entity are different logical entities.

7. The network operator device of claim 6, wherein the RAN inductive task is for a cell of a second cell type.

8. The network operator device of claim 6, wherein the inductive model is generated from data related to multiple cells and the production model is for a specific cell.

* * * * *